United States Patent Office 2,802,862
Patented Aug. 13, 1957

2,802,862

CHLOROALIPHATIC-MONOCARBOXYLIC ACID ESTERS OF 1,4,5,6,7,7 HEXACHLORO BICYCLO-[2.2.1]-HEPT-5-EN-2-METHANOL

Herman O. Senkbeil, Midland, Mich., assignor to The Dow Chemical Company, Midland, Mich., a corporation of Delaware No Drawing. Application July 2, 1956,
Serial No. 595,071

4 Claims. (Cl. 260—487)

The present invention is directed to the chloroaliphatic-monocarboxylic acid esters having the formula

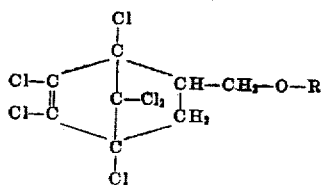

in which R represents a chloroacyl radical of the chloroalkanoic monocarboxylic acid series containing from 2 to 5 carbon atoms, inclusive. These compounds are viscous liquids somewhat soluble in many organic solvents and of low solubility in water. They have been found to be active as herbicides and are adapted to be employed in dust and spray compositions for the control of the growth and the killing of weeds and for the sterilization of soil with regard to the growth of plants. They are also useful as parasiticides for the control of many insect and bacterial organisms.

The new compounds may be prepared by reacting 1,4,5,6,7,7-hexachlorobicyclo[2.2.1]hept-5-en-2-methanol with a chloroaliphatic-monocarboxylic acid such as a chloroacetic acid, a chloropropionic acid, a chlorobutyric acid or a chlorovaleric acid. The reaction may be carried out in the presence of an esterification catalyst such as sulfuric acid, phenol sulfonic acid, or a caton exchange resin in the acid form, and conveniently in a water-immiscible solvent such as ethylene dichloride or toluene. The amount of reactants employed is not critical since some of the desired ester product is produced with any proportion of reagents. Good results are obtained when substantially equimolecular proportions of the reactants are employed. The employment of an excess of the chloroaliphatic monocarboxylic acid and the removal of the water of reaction as formed generally results in optimum yields.

In carrying out the reaction, the alcohol, acid and catalyst, if employed, are mixed and the resulting mixture heated at a temperature of from 75° to 150° C. for a sufficient period of time to complete the reaction. In an alternative method, the reactants and catalyst, if employed, may be dispersed in the solvent and the resulting mixture heated at the boiling temperature. During the heating, a mixture of water of reaction and some of the solvent are continuously removed by distillation, condensed and the solvent recovered.

Upon completion of the reaction, the desired product may be separated by fractional distillation under reduced pressure. Alternatively, the solvent mixture of the reaction product is neutralized with an alkali such as dilute aqueous sodium carbonate. The resulting mixture divides into aqueous and solvent layers. The solvent layer which contains the ester reaction product is separated and washed several times with water. The washed mixture is then fractionally distilled under reduced pressure to separate the desired ester compound.

The following examples illustrate the invention but are not to be construed as limiting:

Example 1.—1,4,5,6,7,7-hexachlorobicyclo[2.2.1]hept-5-en-2-ylmethyl α,α,β-dichloropropionate

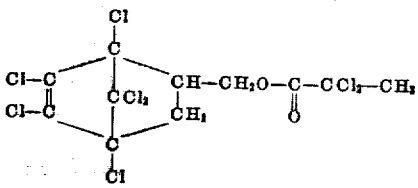

A mixture of 75 grams (0.52 mole) of α,α-dichloropropionic acid and 165.5 grams (0.5 mole) of 1,4,5,6-7,7 - hexachlorobicyclo[2.2.1]hept-5-en-2-methanol dissolved in 200 milliliters of ethylene dichloride was heated at a temperature of from 107° to 118° C. for 68 hours. During the heating period, the water of reaction as formed was removed by distillation as a mixture with some of the solvent. Upon completion of the reaction, the reaction mixture was washed several times with water and the washed mixture fractionally distilled under reduced pressure to separate the desired ester product. This product boiled at 146°–152° C. at 0.5 millimeter pressure and had a chlorine content of 62.51 percent compared to the calculated chlorine content of 62.25 percent.

Example 2.—1,4,5,6,7,7-hexachlorobicyclo[2.2.1]hept-5-en-2-ylmethyl α,α,β-trichloropropionate

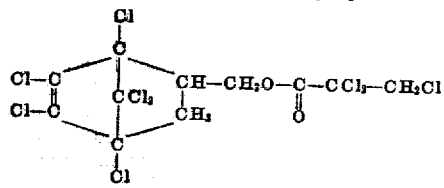

In a similar manner to that described in Example 1, 0.5 mole of α,α,β-trichloropropionic acid and 0.5 mole of 1,4,5,6,7,7-hexachlorobicyclo[2.2.1]hept-5-en-2-methanol were dissolved in 200 milliliters of ethylene dichloride and heated with stirring. The heating was carried out at a temperature of from 102° to 115° C. for a period of 91 hours. The reaction mixture was then washed with water and fractionally distilled under reduced pressure. The desired ester product boiled at 152°–157° C. at 0.1 millimeter pressure and was found to contain 65.02 percent chlorine compared to the calculated value of 65.14 percent.

Example 3.—1,4,5,6,7,7-hexachlorobicyclo[2.2.1]hept-5-en-2-ylmethyl α,α-dichlorobutyrate

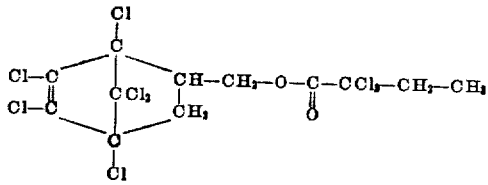

A mixture of 20 grams (0.06 mole) of 1,4,5,6,7,7-hexachlorobicyclo[2.2.1]hept-5-en-2-methanol, 11.8 grams (0.07 mole) of α,α-dichlorobutyric acid and 0.5 milliliter of concentrated sulfuric acid was dissolved in 100 milliliters of ethylene dichloride. The resulting mixture was heated at a temperature of from 92° to 96° C. for a period of 20 hours. During the heating period, the water of reaction was continuously removed as formed from the reaction vessel as a mixture with some of the solvent. The reaction mixture was then washed with water and the ethylene dichloride was removed by distillation under reduced pressure. The desired product was obtained as a viscous liquid residue having a saponification equivalent of 470 and a chlorine content of 60.1 percent as compared to a theoretical equivalent of 470 and a theoretical chlorine content of 60.37 percent.

*Example 4.—1,4,5,6,7,7-hexachlorobicyclo[2.2.1]hept-5-en-2-ylmethyl trichloroacetate*

This compound is prepared as described in Example 3 by the reaction of equimolecular proportions of trichloroacetic acid and 1,4,5,6,7,7-hexachlorobicyclo[2.2.1]hept-5-en-2-methanol in 200 milliliters of ethylene dichloride using sulfuric acid as a catalyst. The ester compound is a viscous liquid having a molecular weight of 476.

*Example 5.—1,4,5,6,7,7-hexachlorobicyclo[2.2.1]hept-5-en-2-ylmethyl α,α,β-dichlorovalerate*

In a manner similar to that described in Example 3, one mole of α,α-dichlorovaleric acid and one mole of 1,4,5,6,7,7-hexachlorobicyclo[2.2.1]hept-5-en-2-methanol dissolved in ethylene dichloride are reacted in the presence of sulfuric acid as catalyst. The desired ester compound is a viscous liquid having a molecular weight of 485.

*Example 6.—1,4,5,6,7,7-hexachlorobicyclo[2.2.1]hept-5-en-2-ylmethyl α,α,β-trichlorobutyrate*

The method described in Example 3 is employed to prepare this compound by the reaction of one mole of α,α,β-trichlorobutyric acid boiling at 236° to 238° C. and one mole of 1,4,5,6,7,7-hexachlorobicyclo[2.2.1]hept-5-en-2-methanol using toluene as a solvent and sulfuric acid as a catalyst. This ester compound has a molecular weight of 505.

The new ester compounds of the present invention have been tested and found to be effective as herbicides and parasiticides and particularly valuable for the killing of nematodes. For such use the products may be dispersed on an inert finely divided solid and employed as dusts. Also, such mixtures may be dispersed in water with the aid of a wetting agent and employed as sprays. In other procedures, the products may be employed as constituents of oil-in-water emulsions or water dispersions with or without the addition of wetting, dispersing or emulsifying agents. In representative operations, complete controls of rootknot nematodes are obtained when the nematodes are contacted with aqueous compositions containing 10 parts by weight of 1,4,5,6,7,7-hexachlorobicyclo[2.2.1]hept-5-en-2-ylmethyl α,α-dichloropropionate per million parts by weight of ultimate mixture.

1,4,5,6,7,7-hexachlorobicyclo[2.2.1]hept-5-en-2-methanol employed as a starting material as herein described is a commercially available alcohol melting at 162° to 162.5° C. and having a molecular weight of 331. This alcohol may be prepared by a Diels-Alder reaction wherein hexachlorocyclopentadiene is condensed with allyl alcohol at a temperature of from about 100° to 150° C.

The preferred esters of the present invention are those prepared from acids such as dichloroacetic acid, trichloroacetic acid, α,α-dichloropropionic acid, α,α,β-trichloropropionic acid, α,α-dichlorobutyric acid and α,α-dichlorovaleric acid. Such compounds may be characterized by the formula

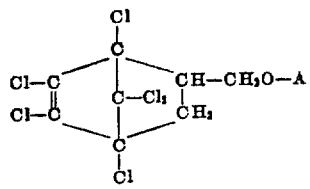

wherein A represents α,α-dichloroacyl or α,α,β-trichloroacyl in which said acyl is of the lower aliphatic series.

I claim:

1. A chloroaliphatic-monocarboxylic acid ester having the formula

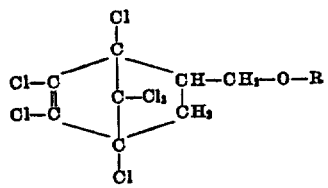

wherein R represents a chloroacyl radical of the chloroalkanoic monocarboxylic acid series containing from 2 to 5 carbon atoms, inclusive.

2. 1,4,5,6,7,7 - hexachlorobicyclo[2.2.1]hept-5-en-2-ylmethyl α,α-dichloropropionate.

3. 1,4,5,6,7,7 - hexachlorobicyclo[2.2.1]hept-5-en-2-ylmethyl α,α,β-trichloropropionate.

4. 1,4,5,6,7,7 - hexachlorobicyclo[2.2.1]hept-5-en-2-ylmethyl α,α-dichlorobutyrate.

References Cited in the file of this patent

Fields: J. Am. Chem. Soc. 76 (1954), 2709–10.
McBee et al.: J. Am. Chem. Soc. 77 (1955), 4427–8.

UNITED STATES PATENT OFFICE
Certificate of Correction

Patent No. 2,802,862　　　　　　　　　　　　　　　　　　　　　August 13, 1957

Herman O. Senkbeil

It is hereby certified that error appears in the printed specification of the above numbered patent requiring correction and that the said Letters Patent should read as corrected below.

Column 1, line 42, for "caton" read —cation—; column 2, line 5, for "$\alpha,\alpha,\beta$-dichloropropionate" read —$\alpha,\alpha$-dichloropropionate—; column 3, line 17, for "$\alpha,\alpha,\beta$-dichlorovalerate" read —$\alpha,\alpha$-dichlorovalerate—.

Signed and sealed this 19th day of November 1957.

[SEAL]

Attest:
KARL H. AXLINE,
*Attesting Officer.*

ROBERT C. WATSON,
*Commissioner of Patents.*